(12) United States Patent
Hsu

(10) Patent No.: US 8,228,157 B2
(45) Date of Patent: Jul. 24, 2012

(54) LAYOUT FOR INDUCTIVE LOOPS OF THE ELECTROMAGNETIC-INDUCTION SYSTEM

(75) Inventor: Chung-Wen Hsu, Kaohsiung (TW)

(73) Assignee: Waltop International Corporation, Hsinchu (TW)

( * ) Notice: Subject to any disclaimer, the term of this patent is extended or adjusted under 35 U.S.C. 154(b) by 132 days.

(21) Appl. No.: 12/726,214

(22) Filed: Mar. 17, 2010

(65) Prior Publication Data

US 2011/0080249 A1 Apr. 7, 2011

(30) Foreign Application Priority Data

Oct. 1, 2009 (TW) .............................. 98133467 A

(51) Int. Cl.
*H01F 27/28* (2006.01)
*H01F 5/00* (2006.01)
*G06F 3/041* (2006.01)
*H03M 1/22* (2006.01)

(52) U.S. Cl. .............. 336/225; 336/200; 345/173; 341/5
(58) Field of Classification Search .................. 336/187, 336/189, 192, 200, 223, 225; 345/173, 174, 345/176, 179; 341/5, 15
See application file for complete search history.

(56) References Cited

U.S. PATENT DOCUMENTS

| | | | | |
|---|---|---|---|---|
| 3,222,756 A * | 12/1965 | Kanfman | ......................... | 29/604 |
| 3,351,879 A * | 11/1967 | Kaufman | ....................... | 336/170 |
| 3,999,012 A * | 12/1976 | Dym | ................................. | 341/5 |
| 4,835,347 A * | 5/1989 | Watson | ....................... | 178/18.07 |
| 4,878,553 A * | 11/1989 | Yamanami et al. | ......... | 178/18.07 |
| 5,008,833 A * | 4/1991 | Agranat et al. | ................. | 706/40 |
| 5,051,545 A * | 9/1991 | McDermott | ................ | 178/18.07 |
| 5,220,324 A * | 6/1993 | Morita | ............. | 341/32 |
| 5,245,336 A * | 9/1993 | Chen et al. | ......................... | 341/5 |
| 5,657,011 A * | 8/1997 | Komatsu et al. | .................... | 341/5 |
| 5,698,976 A * | 12/1997 | Nakajima et al. | ......... | 324/207.23 |
| 5,854,449 A * | 12/1998 | Adkins | ....................... | 178/18.02 |
| 6,294,910 B1 * | 9/2001 | Travostino et al. | ....... | 324/207.25 |
| 6,787,715 B2 * | 9/2004 | Chao et al. | ................. | 178/18.01 |
| 6,882,339 B2 * | 4/2005 | Chao et al. | .................... | 345/174 |
| 6,909,426 B2 * | 6/2005 | Chao et al. | .................... | 345/173 |
| 8,138,876 B2 * | 3/2012 | Ding et al. | .................... | 336/200 |

* cited by examiner

Primary Examiner — Anh Mai
Assistant Examiner — Joselito Baisa
(74) Attorney, Agent, or Firm — Squire Sanders (US) LLP

(57) ABSTRACT

The present invention relates to a new layout for inductive loops of the electromagnetic-induction system, and particularly relates to a new layout for inductive loops of the electromagnetic-induction system which can be integrated with another type of input system. The inductive loop structure of the layout for inductive loops of the electromagnetic-induction system comprises a plurality of ⊓-shaped regions, a plurality of switches, a plurality of grounding lines, a grounding switch, and a plurality of signal ports. The ⊓-shaped regions are connected with each other to form a fence-shaped inductive loop structure, but the ⊓-shaped regions are not interlaced with each other. By this way, the difficulties and the complication for layout for inductive loops of the electromagnetic-induction system are decreased. Therefore, it helps the layout for inductive loops of the electromagnetic-induction system to be integrated with another type of input system into one system.

28 Claims, 7 Drawing Sheets

LAYOUT FOR INDUCTIVE LOOPS OF THE ELECTROMAGNETIC-INDUCTION SYSTEM

FIELD OF THE INVENTION

The present invention relates to a new layout for inductive loops of the electromagnetic-induction system, and particularly relates to a new layout for inductive loops of the electromagnetic-induction system which can be integrated with another type of input system.

BACKGROUND OF THE INVENTION

In general, inductive loops and layout thereof in the conventional electromagnetic-induction device arranges inductive loops as check network that are distributed with equidistance in the X-direction and Y-direction of two-dimensional Cartesian coordinates to induce the electromagnetic pen and calculate the absolute position thereof. Referring to FIG. 1A, it shows a layout for inductive loops distributed in the X-direction of two-dimensional Cartesian coordinates, wherein one terminal of each of the inductive loops 110A is connected to each switch (X0 to X7) and the other terminal is electrically coupled with a ground wire 105A, whereby the reduced signal of each of the inductive loops 110A can be detected by controlling the switches (X0 to X7). Because of the inverse proportion of the magnetic field intensity to the square of distance the electromagnetic pen that can emit electromagnetic signal is away from the tablet to result in more and more weak induced signal that is received by inductive loops; on the contrary, the induced signal that is received by inductive loops is an increasing number of intensity when the electromagnetic pen approaches the tablet. Therefore, CPU of the tablet scans one by one and in turn each of the inductive loops to analyze intensity of induced signals that are received by each inductive loops, so as to detect the position where the cordless pen is located and calculate the coordinates thereof.

Referring to FIG. 1B, it shows a layout for inductive loops distributed in the Y-direction of two-dimensional Cartesian coordinates, wherein one terminal of each of the inductive loops 110B is connected to each switch (Y0 to Y7) and the other terminal is electrically coupled with a ground wire 105B, whereby the reduced signal of each of the inductive loops 110A can be detected by controlling the switches (Y0 to Y7). The difference between the inductive loops 110A and the inductive loops 110B is that they are distributed in different directions of two-dimensional Cartesian coordinates. Referring to FIG. 1C, it shows a layout comprising the inductive loops 100A (as FIG. 1A shows) distributed in the X-direction of two-dimensional Cartesian coordinates and the inductive loops 100B (as FIG. 1A shows) distributed in the Y-direction of two-dimensional Cartesian coordinates, However, in the trend that a electronic device has a need to be multi-function or versatile, a tablet or a electromagnetic-induction device no longer only has a single input mode with electromagnetic induction, but further it is integrated with various kinds of input device, and particular with a touch device, for example a projected capacitance touch device or a capacitive matrix touch device. Therefore, the tablet or the electromagnetic-induction device can be integrated with a touch device to have more input modes and functions.

Because the layout for inductive loops in conventional electromagnetic-induction device is an interlaced layout for inductive loops (as FIG. 1A FIG. 1B shows), it has a need that through holes 102A or 102B are formed at the places where each inductive loop is interlaced with other inductive loops. Therefore, the inductive loops can extend to other layers by the through holes 102A or 102B for preventing the inductive loops from contacting with each other and from the interference resulted from the contact between the inductive loops. Take one inductive loop showed in FIG. 1A as an example, the through holes 102A are formed at the place where the inductive loop connected with the switch X2 and the inductive loop connected with the switch X1 are interlaced at for preventing the inductive loop connected with the switch X2 from contacting with the inductive loop connected with the switch X1. Therefore, the inductive loop connected with the switch X2 extends to another layer or plane, which is different from the layer or plane with the inductive loop connected with the switch X1 deposed thereon, by the through holes 102A. Although in plane view of the layout showed in FIG. 1A, the inductive loop connected with the switch X2 and the inductive loop connected with the switch X1 are interlaced with each other, but in fact, they do not contact with each other because the inductive loop connected with the switch X2 extends to another layer or plane by the through holes 102A. The other inductive loops showed in FIG. 1A, FIG. 1B and FIG. 1C are formed by same method.

Because the foregoing layout for inductive loops of conventional electromagnetic-induction device having only function or mode is formed on a hard circuit board or a flexible circuit board, the through holes and inductive loops are easy to formed, even the layout is formed with complicated and more steps. However, if the conventional electromagnetic-induction is integrated with a touch device, the inductive loops need to be fabricated on the substrate of the touch device. It is difficult to fabricate so many and so small through holes on the substrate of the touch device because the substrate of the touch device and the circuit board are made of such different materials. Accordingly, the difficulty in integrating the conventional electromagnetic-induction device with a touch device increases and the possibility of integrating the conventional electromagnetic-induction device with a touch device decreases. Therefore, in view of foregoing drawbacks of the layout for inductive loops of conventional electromagnetic-induction device, there is a need to provide a new layout for inductive loops of an electromagnetic-induction system without through holes. Besides, it is capable of being integrated with a touch device in the same substrate or medium for fabricating an input device with multi-function.

SUMMARY OF THE INVENTION

An objective of this invention is to provide a new layout for inductive loops of an electromagnetic-induction device to solve the problem that the electromagnetic-induction system can not be integrated with a touch device in the same substrate or medium to be an input device with multi-function result because of the through holes.

In one embodiment of the present invention, an inductive loop structure is disclosed. The disclosed inductive loop comprises a plurality of ⊓-shaped regions, a plurality of switches, a plurality of grounding lines, a grounding switch and a plurality of signal ports. The ⊓-shaped regions are connected with each other to form a fence-shaped inductive loop structure and each end points of each ⊓-shaped region is connected to one of the switches. Each of the grounding lines has a grounding terminal and an inductive loop terminal wherein each inductive loop terminal corresponds to one of the two end points of a ⊓-shaped region and all grounding terminals of the grounding lines correspond to the same grounding switch. Therefore, the grounding switch can be switched to any one of the grounding lines for the grounding switch to select which the grounding line the grounding switch want to be connected to. Besides, each of the signal ports corresponds to one of the end points of the ⊓-shaped regions and it means that each end point of ⊓-shaped regions correspond to one of the signal port and one inductive loop terminal of one grounding line at the same time.

In another embodiment of the present invention, a layout for inductive loops of an electromagnetic-induction system is disclosed. The disclosed layout for inductive loops of an electromagnetic-induction system comprises a first inductive loop distributing in X-direction of two-dimensional coordinates in the electromagnetic-induction system and a second inductive loop distributing in Y-direction of two-dimensional coordinates in the electromagnetic-induction system. Each of the first inductive loop and the second inductive loop comprises a plurality of ⊓-shaped regions connected with each other, a plurality of switches connected to one of end points of the ⊓-shaped regions, a plurality of grounding lines, a grounding switch and a plurality of signal ports. Each grounding terminal of the grounding lines corresponds to one end point of the ⊓-shaped regions and each grounding terminal of the grounding lines corresponds to the grounding switch. Furthermore, each of the signal ports corresponds to one of the end points of the ⊓-shaped regions and it means that each end point of ⊓-shaped regions correspond to one of the signal ports and one inductive loop terminal of one grounding line at the same time.

In another embodiment of the present invention, a method for fabricating a layout for inductive loops of an electromagnetic-induction system is disclosed. The disclosed method for fabricating a layout for inductive loops of an electromagnetic-induction system comprises providing a substrate, forming a first inductive loop distributing in one direction of two-dimensional coordinates on one surface of the substrate (for example in X-direction of two-dimensional coordinates), forming an insulation layer on the substrate for covering the surface of the substrate and the first inductive loop, forming a second inductive loop distributing in another direction of two-dimensional coordinates on the insulation layer (for example in Y-direction of two-dimensional coordinates), and forming another insulation layer on the previous insulation layer and the second inductive loop for covering the previous insulation layer and the second inductive loop. Each of the first inductive loop and the second inductive loop comprises a plurality of ⊓-shaped regions connected with each other and a plurality of grounding lines. Each of the ⊓-shaped regions is a square or rectangular area having an opening at one side thereof, and all opening of the ⊓-shaped regions face the same opening direction and they are aligned at the same side.

In above-mentioned embodiments, a non-interlaced inductive loop structure is formed by connecting the ⊓-shaped regions with each other to form a fence-shaped inductive loop structure so it has no need of the through holes. Therefore, the layout for inductive loops of an electromagnetic-induction system can be formed in a substrate, for example glass substrate, a hard circuit board or a flexible circuit board, and the electromagnetic-induction system can be integrated with a touch device into the same device by this way.

Therefore, the effect achieved with the present invention is to provide an inductive loop structure, a layout for inductive loops of an electromagnetic-induction system and a method for fabricating a layout for inductive loops of an electromagnetic-induction system to form a non-interlaced inductive loop structure without the through holes. By this way, the layout for inductive loops of the electromagnetic-induction system can be formed in a substrate, for example glass substrate, a hard circuit board or a flexible circuit board, and the electromagnetic-induction system can be integrated with a touch device into the same device.

BRIEF DESCRIPTION OF THE DRAWINGS

FIG. 2B is a plane view form diagram illustrating the inductive loop of FIG. 2A in a state that the inductive loop is turned on.

DESCRIPTION OF THE EXEMPLARY EMBODIMENTS

Although the present invention will be described in accordance with the embodiments shown below, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Figure 2A:
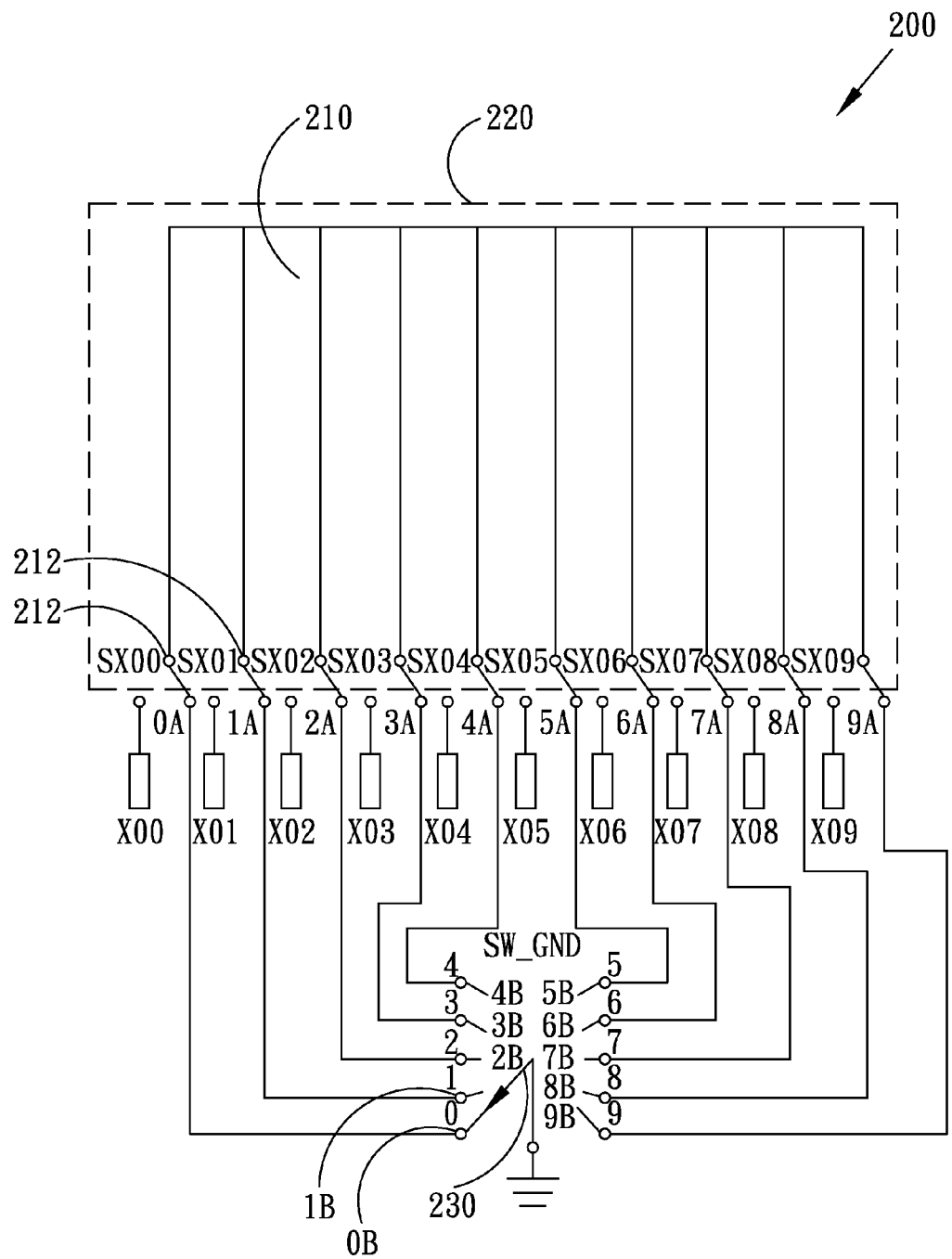
FIG. 2A is a plane view form diagram illustrating a layout for inductive loops distributed in the X-direction of two-dimensional coordinates in an electromagnetic-induction system in accordance with one embodiment of the present invention.

Referring to FIG. 2A, it is a plane view form diagram illustrating the layout for inductive loop 200 distributed in the X-direction of two-dimensional coordinates in an electromagnetic-induction system in accordance with one embodiment of the present invention. The inductive loop 200 (or inductive loop structure 200) comprises a plurality of ⊓-shaped regions 210 which are connected with each other, and each of the ⊓shaped regions 210 is a square or rectangular area having an opening at one side thereof. All openings of the ⊓-shaped regions 210 face the same opening direction so it means that all openings of the ⊓-shaped regions 210 are aligned at the same sides of the n-shaped regions. Furthermore, each of ⊓-shaped regions 210 has two end points 212 and the two end points 212 are the two ends of the opening respectively. Each of the ⊓-shaped regions 210 and it's adjacent ⊓-shaped region share one side and one end point thereof so the ⊓-shaped regions 210 are connected with each other to form a fence-shaped region 220 (or a fence-shaped inductive loop structure). All bottoms sides of the ⊓-shaped regions 210 are at the same level and it means that all of the sides of the ⊓-shaped regions 210, which are opposite to the sides of the ⊓-shaped regions 210 with the openings, are at the same level. Therefore, all bottom sides are arranged as a continuous and straight line to be the bottom of the fence-shaped region 220.

Furthermore, the inductive loop structure 200 further comprises a plurality of switches (SX00-SX09), a plurality of grounding lines (0-9), a grounding switch 230 and a plurality of signal ports (X00-X09). Each end point 212 of the ⊓-shaped regions 210 is electrically coupled with or connected to one of the switches (SX00-SX09). Each of the grounding lines (0-9) has an inductive loop terminal (0A-9A) and a grounding terminal (0B-9B), and each inductive loop terminal (0A-9A) of the grounding lines (0-9) corresponds to one of the end points 212 of the ⊓-shaped regions 210. When the inductive loop structure 200 is not turned on, each of the switches (SX00-SX09) is electrically coupled with one end point 212 of the ⊓-shaped regions 210 and one of the grounding terminal (0B-9B) of the grounding lines (0-9). Each grounding terminal (0B-9B) of the grounding lines (0-9) corresponds to the grounding switch 230. The grounding switch 230 is switched to select which grounding line (0-9) to be electrically couple with the grounding switch 230 for forming a ground.

Besides, each end point 212 of the ⊓-shaped regions 210 corresponds to one of the signal ports (X00-X09) so each end point 212 of the ⊓-shaped regions 210 corresponds to one of the signal ports (X00-X09) and one of the inductive loop terminals (0A-9A) of the grounding lines (0-9) at the same time. The signal port (X00-X09) and the grounding lines (0-9) corresponding to the same end point 212 are adjacent to each other, and the switch (SX00-SX09) corresponding to the same end point 212 can be switched between the signal port (X00-X09) and the grounding lines (0-9) for selecting which one to be electrically couple with the end point 212 and for controlling the inductive loop to be turned on and off Each of the signal port (X00-X09) is used to turn on the different inductive loops in the inductive loop structure 200.

Figure 1A:
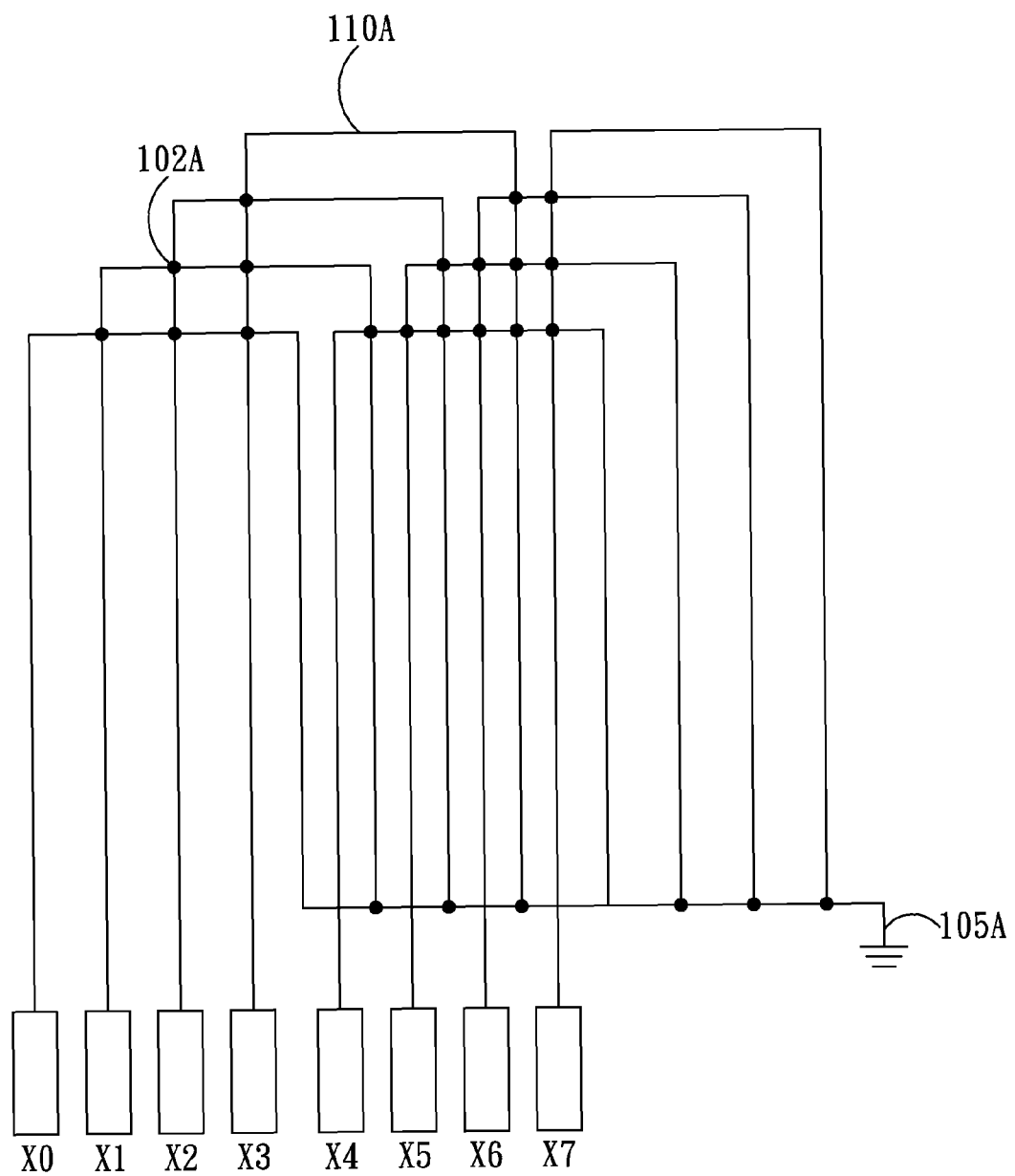
FIG. 1A is a plane view form diagram illustrating a layout for inductive loops distributed in the X-direction of two-dimensional Cartesian coordinates in a conventional electromagnetic-induction device.
Figure 2B:
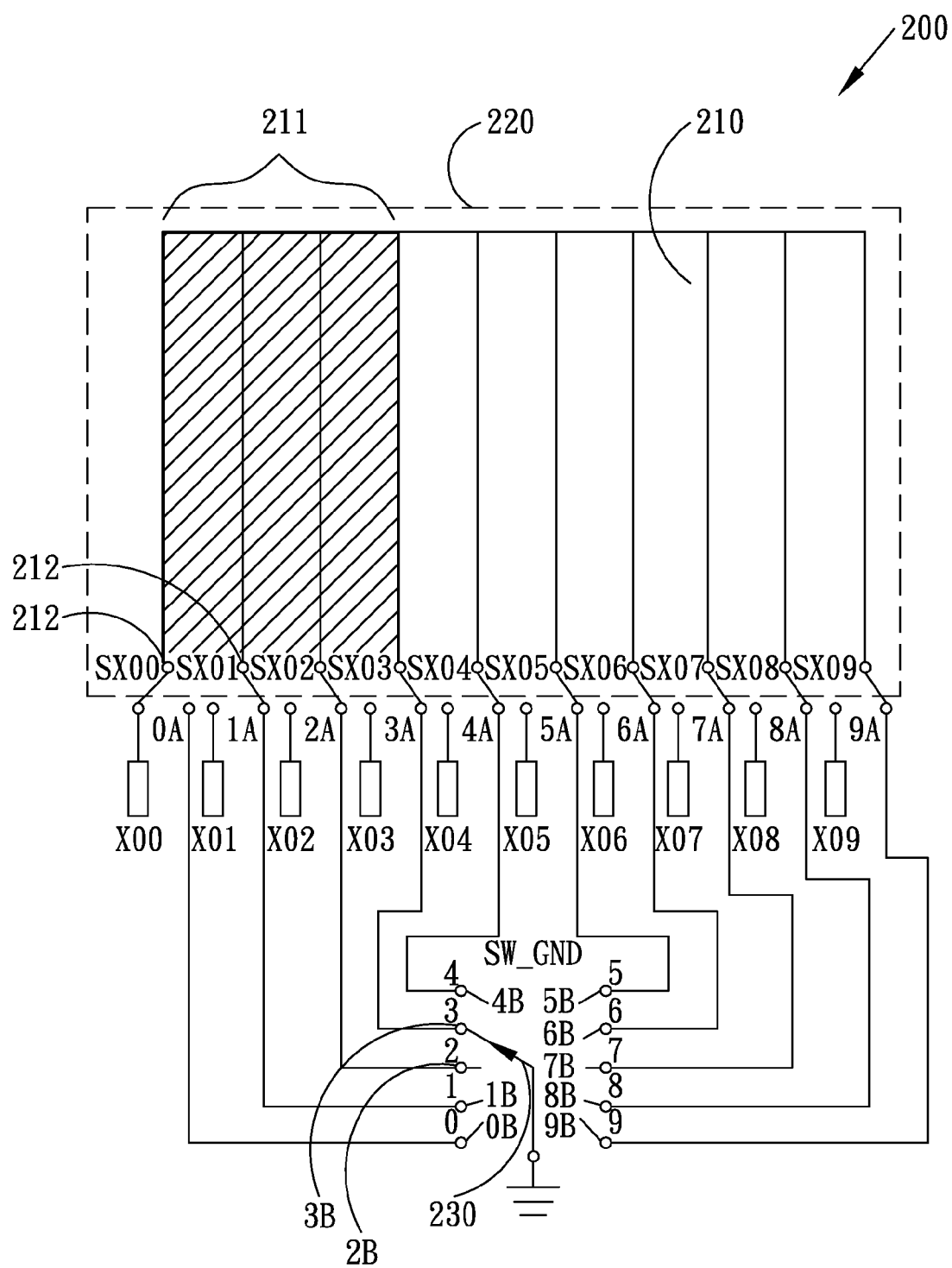

Referring to FIG. 2B, it is a plane view form diagram illustrating the inductive loop of FIG. 2A in a state that the inductive loop 200 is turned on. The switch SX00 is switched form the inductive loop terminal 0A of the grounding line 0 to the signal port X00 for turning on the inductive loop electrically coupled with the signal port X00. Furthermore, the grounding switch 230 is switched from the grounding terminal 0B of the grounding line 0 to the grounding terminal 3B of the grounding line 3 for forming a ground. At the same time, the inductive loop 211 from the switch SX00 to the switch SX03 (as the area with oblique lines therein showed in FIG. 2B) becomes a closed inductive loop because the inductive loop 211 is connected with both of the signal port X00 and the inductive loop terminal 3A of the grounding line 3, and the grounding switch 230 is connected with the grounding terminal 3B of the grounding line 3. By this inductive loop 211, the electromagnetic signals in the area form the switch SX00 to the switch SX03 can be induced by the electromagnetic-induction system. The area form the switch SX00 to the switch SX03 means the area enclosed by the ⊓-shaped region which is formed by connecting switch SX00 to the switch SX03 and it shows with oblique lines in FIG. 2B. The area of the ⊓-shaped region formed by connecting switch SX00 to the switch SX03 is equal to the sum of the areas of the three ⊓-shaped regions between the switch SX00 and the switch SX03. The ⊓-shaped region formed by connecting switch SX00 to the switch SX03 receives the electromagnetic signals emitted from the electromagnetic pen, and then the electromagnetic signals are transferred to a processor through the signal port X00 for processing and calculating the electromagnetic signals. The inductive loop 211 showed in FIG. 2B, which is formed by connecting switch SX00 to the switch SX03, is the same as the inductive loop between the switch X0 and the switch X3 showed in the layout for inductive loops of FIG. 1A. Therefore, although the inductive loop structure 200 is different from the interlaced layout for the conventional inductive loops but both of them perform the same inducing mode and method for calculating the position of the electromagnetic pen. In the inductive loop structure 200, the different inductive loops are turned on by switching the different switches (SX00-SX09) to the different signal ports (X00-X09), and the inductive loop is controlled by switching the grounding switch 230 to the different grounding terminals (0B-9B) of the grounding lines (0-9).

Figure 2C:
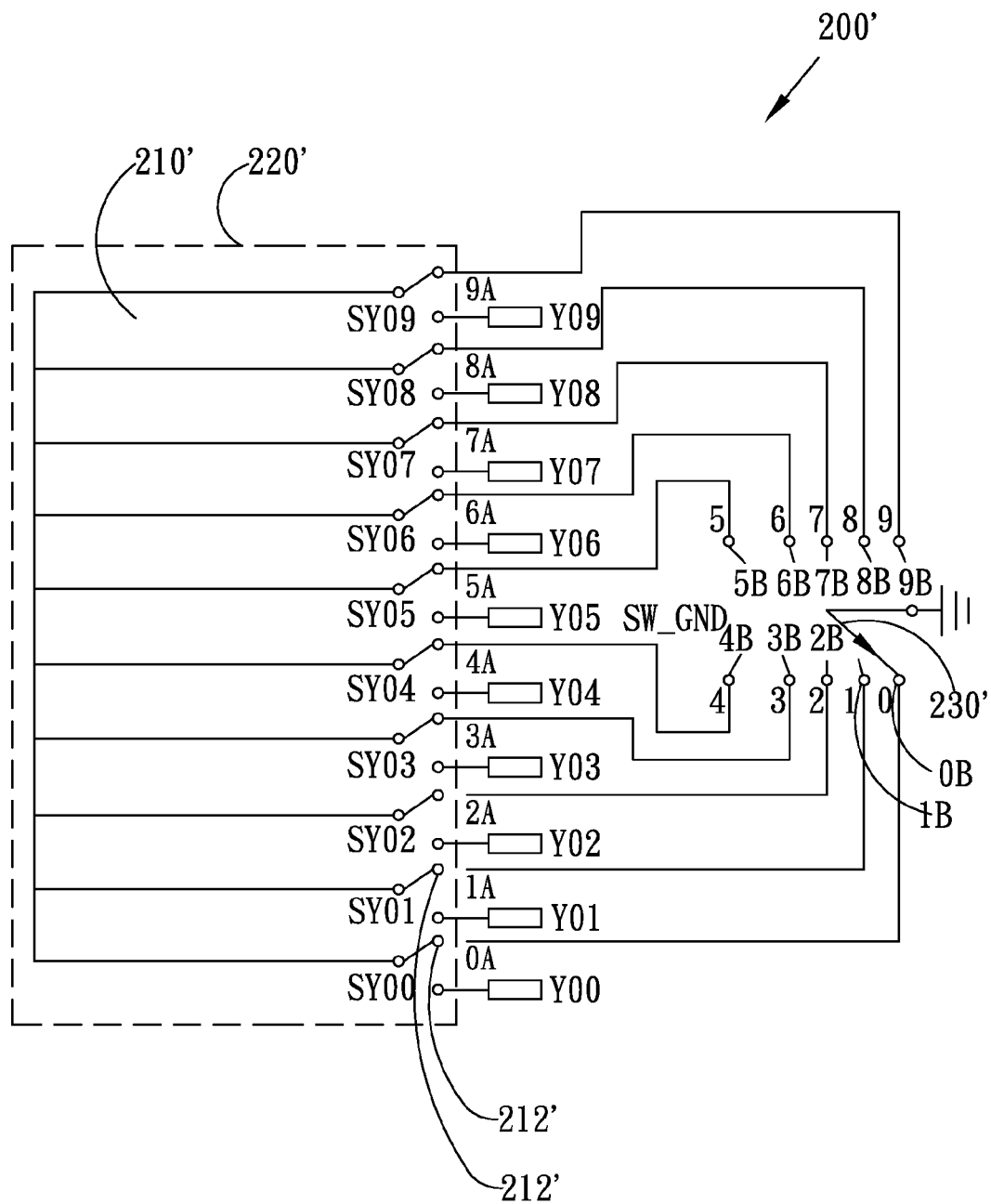
FIG. 2C is a plane view form diagram illustrating a layout for inductive loops distributed in the Y-direction of two-dimensional coordinates in an electromagnetic-induction system in accordance with one embodiment of the present invention.

Referring to FIG. 2C, it is a plane view form diagram illustrating the layout for inductive loops 200' of the electromagnetic-induction system in accordance with another embodiment of the present invention. The inductive loop structure 200' is an inductive loop structure distributed in the Y-direction of two-dimensional coordinates in an electromagnetic-induction system. As the inductive loop structure 200 showed in FIG. 2A, the inductive loop structure 200' also comprises a plurality of ⊓-shaped regions 210' connected with each other, a plurality of switches (SY00-Y09) connected to one of end points 212' of the ⊓-shaped regions 210', a plurality of grounding lines (0-9), a grounding switch 230' and a plurality of signal ports (Y00-Y09). The inductive loop structure 200' has the same structure as the inductive loop structure 200 showed in FIG. 2A, and the only difference between them is that the inductive loop structure 200' is distributed in the Y-direction of two-dimensional coordinates but the inductive loop structure 200 is distributed in the X-direction of two-dimensional coordinates.

Figure 1B:
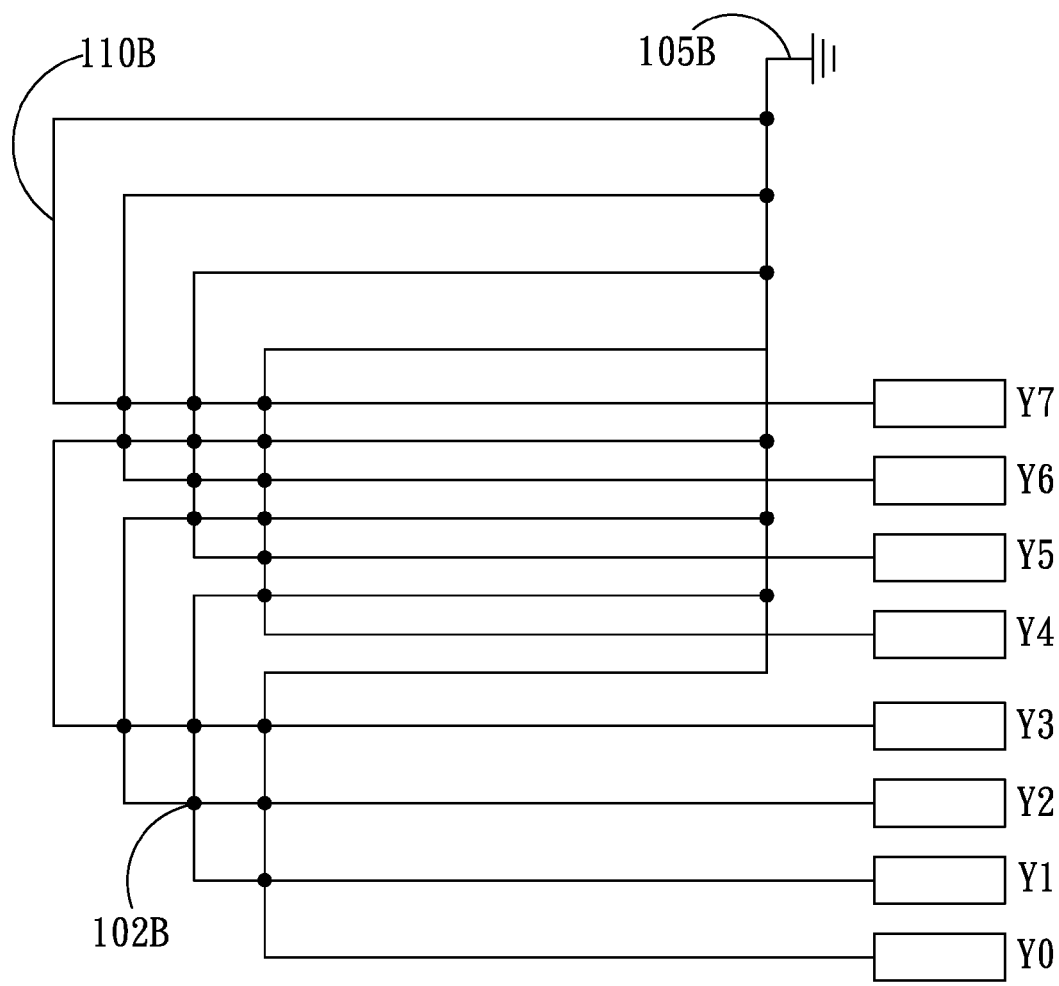
FIG. 1B is a plane view form diagram illustrating a layout for inductive loops distributed in the Y-direction of two-dimensional Cartesian coordinates in a conventional electromagnetic-induction device.
Figure 1C:
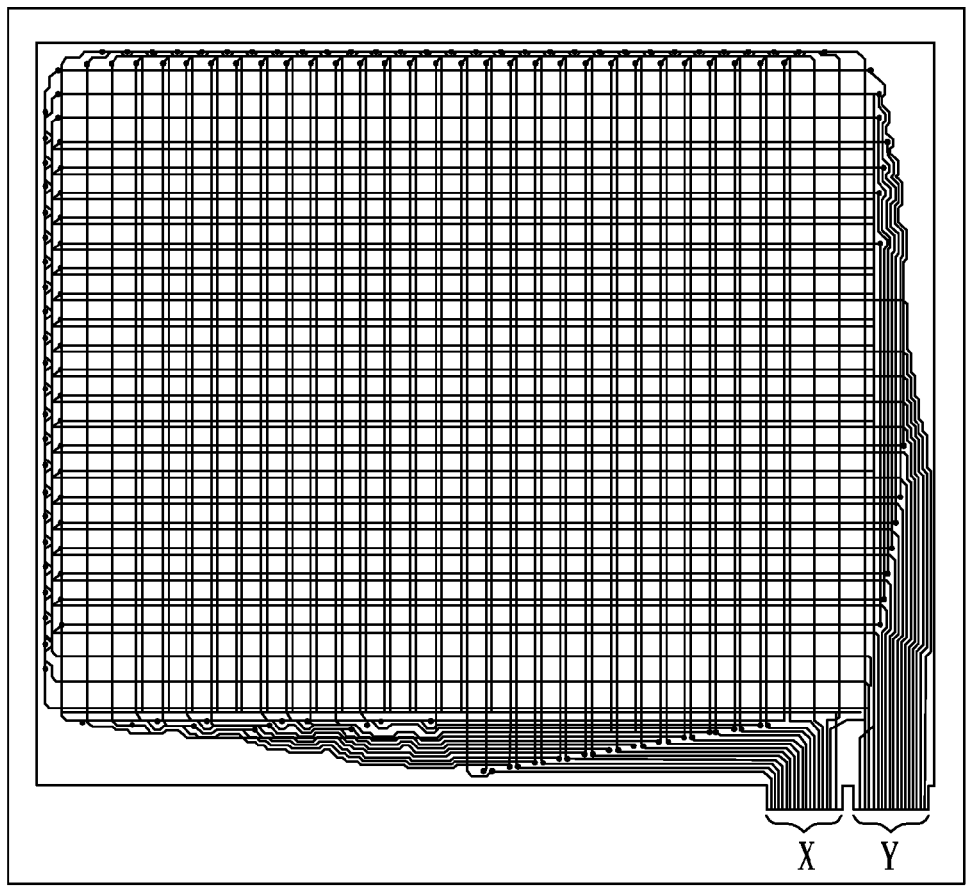
FIG. 1C is a plane view form diagram illustrating a layout for inductive loops in a conventional electromagnetic-induction device.

Referring to FIG. 2A, FIG. 2B and FIG. 2C, although the inductive loop structure 200, the inductive loop structure 200' and the conventional inductive loops showed in FIG. 1A-1C are formed by several ⊓-shaped regions, but in the inductive loop structures 200 and 200', the ⊓-shaped regions are connected with each other to form a fence-shaped region (or a fence-shaped inductive loop structure) by the method that each of the ⊓-shaped regions and it's adjacent ⊓-shaped region share one side and one end point of the ⊓-shaped region. The fence-shaped region (or a fence-shaped inductive loop structure) is a non-interlaced inductive loop structure so it need not to fabricate the through holes used to prevent the inductive loops from contacting with each other. The contact is caused by interlaced when the layout for the inductive loops is made. Therefore, the problem about that the through holes are difficult to be formed on a substrate, such as a glass substrate, a hard circuit board or a flexible circuit board, can be resolved.

The present invention further provides a new layout for inductive loops of an electromagnetic-induction system wherein the layout comprises a first inductive loop distributed in the X-direction of two-dimensional coordinates in the electromagnetic-induction system as the inductive loop 200 showed in FIG. 2A and a second inductive loop distributed in the Y-direction of two-dimensional coordinates in the electromagnetic-induction system as the inductive loop 200' showed in FIG. 2C. The layout for inductive loops of the electromagnetic-induction system is formed by overlapping the inductive loop 200 and the inductive loop 200', and the inductive loop 200 and the inductive loop 200' are deposed respectively on different layer independently without contacting with each other. Both of the first inductive loop and the second inductive loop comprise a plurality of ⊓-shaped regions connected with each other to form a fence-shaped region (or a fence-shaped inductive loop structure), a plurality of switches respectively connected to the end points of the ⊓-shaped regions, a plurality of grounding lines, a grounding switch and a plurality of signal ports.

The layout for inductive loops of the electromagnetic-induction system can be deposed on a hard circuit board or a flexible circuit board, or it can be deposed on a glass substrate. When the layout for inductive loops of the electromagnetic-induction system is deposed on one surface of a glass substrate, the electromagnetic-induction system can be integrated with the other input device, and particularly integrated with a touch device. For example, when the layout for inductive loops of the electromagnetic-induction system is formed on the glass substrate, the layout for inductive loops of the electromagnetic-induction system can be formed on one surface of the glass substrate and contact members of a touch device can be formed on another surface of the glass substrate which is opposite to the surface with the layout for inductive loops deposed thereon. Because both of the first inductive loop and the second inductive loop of the electromagnetic-induction system are the non-interlaced inductive loop structures the layout for inductive loops of the electromagnetic-induction system is easy to be formed on the glass substrate without any through holes, and the electromagnetic-induction system can be connected or integrated with a touch device as an input device or into the same input device.

Figure 3:
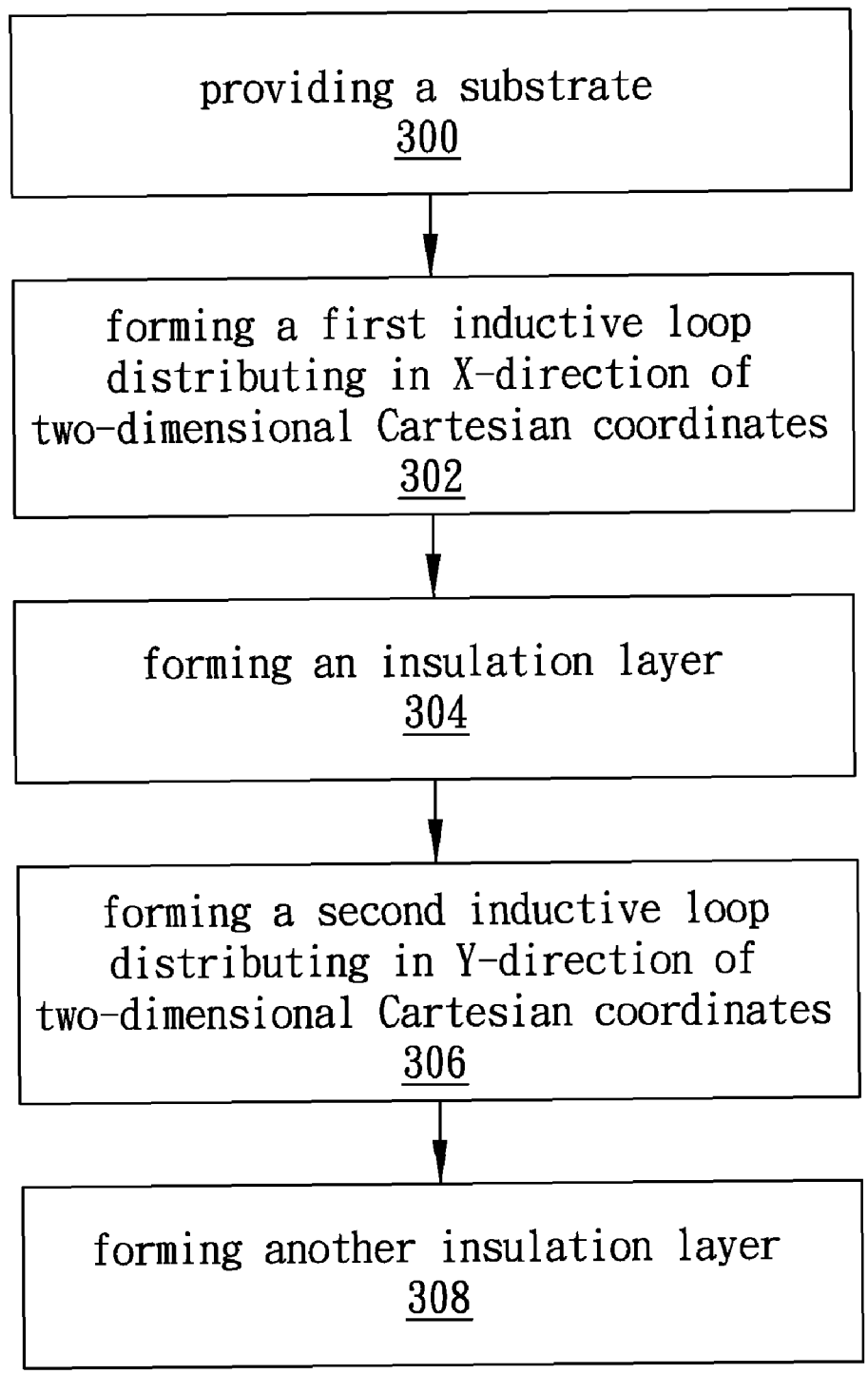
FIG. 3 is a block diagram illustrating the method for fabricating the layout for inductive loops of an electromagnetic-induction system in accordance with one embodiment of the present invention.

Furthermore, the present invention further provides a method for fabricating a layout for inductive loops of an electromagnetic-induction system. The layout for inductive loops fabricated by this method can integrate the electromagnetic-induction system with the other input device, for example a touch device. Referring to FIG. 3, it is a block diagram illustrating the method for fabricating the layout for inductive loops of the electromagnetic-induction system in accordance with one embodiment of the present invention. In this method, first, a substrate is provided for forming fabricating the layout for inductive loops in an electromagnetic-induction system (step 300) and the substrate is a hard circuit board, a flexible circuit board or a glass substrate. Next, a first inductive loop distributing in X-direction of two-dimensional coordinates in the electromagnetic-induction system is formed on one surface of the substrate (step 302). The first inductive loop comprises a plurality of ⊓-shaped regions connected with each other and a plurality of grounding lines. Each of the ⊓-shaped regions is a square or rectangular area having an opening at one side thereof, and all openings of the ⊓-shaped regions face the same opening direction. All openings of the ⊓-shaped regions are aligned at the same side. After that, a plurality of switches, a plurality of signal ports and a grounding switch are formed in the first inductive loop. Each of the end points of the ⊓-shaped regions in the first inductive loop is coupled with or connected to one of the switches in the first inductive loop, and each of the end points of the ⊓-shaped regions in the first inductive loop corresponds to one of the grounding lines and one of the signal ports in the first inductive loop.

Next, an insulation layer is formed on one surface of the substrate and the first inductive loop to cover the surface of the substrate and the first inductive loop (step 304). And then, a second inductive loop distributing in Y-direction of two-dimensional coordinates in the electromagnetic-induction system is formed on the insulation layer (step 306). Finally, another insulation layer is formed on the previous insulation layer to cover the previous insulation layer and the second inductive loop (step 308). The second inductive loop comprises a plurality of ⊓-shaped regions connected with each other and a plurality of grounding lines. Each of the ⊓-shaped regions of the second inductive loop is a square or rectangular area having an opening at one side thereof, and all openings of the n-shaped regions face the same opening direction. All openings of the n-shaped regions are aligned at the same side. After that, a plurality of switches, a plurality of signal ports and a grounding switch are formed in the second inductive loop so the layout for inductive loops of the electromagnetic-induction system of the present invention is finished. Each of the end points of the ⊓-shaped regions in the second inductive loop is coupled with or connected to one of the switches in the second inductive loop, and each of the end points of the ⊓-shaped regions in the second inductive loop corresponds to one of the grounding lines and one of the signal ports in the second inductive loop. The first inductive loop structure is the same with the inductive loop structure 200 showed in FIG. 2A and the second inductive loop structure is the same with the inductive loop structure 200' showed in FIG. 2C.

In this embodiment, the first inductive loop distributes in X-direction of two-dimensional coordinates on the surface of the substrate and the second inductive loop distributes in Y-direction of two-dimensional coordinates on the insulation layer. Therefore, in this embodiment, the first inductive loop distributes in X-direction of two-dimensional coordinates is firstly formed (step 302), and then, the second inductive loop distributes in Y-direction of two-dimensional coordinates is formed (step 306). However, in another embodiment, the first inductive loop distributes in Y-direction of two-dimensional coordinates on the surface of the substrate and the second inductive loop distributes in X-direction of two-dimensional coordinates on the insulation layer. It means that in this embodiment, the first inductive loop distributes in Y-direction of two-dimensional coordinates is firstly formed, and then, the second inductive loop distributes in X-direction of two-dimensional coordinates is formed.

Furthermore, the method further comprises the step of forming an indium tin oxide (ITO) deposed on one surface of the glass substrate for forming the layout for inductive loops of the electromagnetic-induction system, and the step of forming another indium tin oxide (ITO) on another surface of the glass substrate without any inductive loop deposed thereon in order to form a touch device and to integrate the touch device with the electromagnetic-induction system. Therefore, an input device with multi-function is formed and got by this method of present invention. It has no need to fabricate the through holes in the electromagnetic-induction system because both of the first inductive loop and the second inductive loop are the non-interlaced inductive loops and they are deposed on different layers of the electromagnetic-induction system (or on different layers of the substrate of the electromagnetic-induction system) respectively and independently without contacting with each other. Therefore, the other input device can be fabricating on the substrate to integrate the electromagnetic-induction system with the other input device.

The present invention is to provide an inductive loop structure, a layout for inductive loops of an electromagnetic-induction system and a method for fabricating a layout for inductive loops of an electromagnetic-induction system. In this invention, a non-interlaced inductive loop structure is formed by the method that several ⊓-shaped regions are connected with each other to form a fence-shaped region (or a fence-shaped inductive loop structure) so it has no need of requirement for the through holes. By this way, the layout for inductive loops of an electromagnetic-induction system can be formed on a substrate by simpler process and the electromagnetic-induction system can be integrated with the other input device into the same device, for example a touch device.

What is claimed is:

1. A inductive loop structure, comprising:
 a plurality of ⊓-shaped regions wherein said ⊓-shaped regions are connected with each other and each of said ⊓-shaped regions has two end points and shares one side thereof with a adjacent ⊓-shaped region;
 a plurality of switches wherein each of said end points of said ⊓-shaped regions is connected with one of said switches;
 a plurality of grounding lines wherein each of said grounding lines has a grounding terminal and an inductive loop terminal corresponding to one of said end points of said ⊓-shaped regions;
 a grounding switch capable of being switched to any said grounding terminals of said grounding lines; and
 a plurality of signal ports wherein each of said signal ports corresponds to one of said end points of said ⊓-shaped regions.

2. The inductive loop structure of claim 1, wherein each of said ⊓-shaped regions is a square or rectangular area having an opening at one side thereof.

3. The inductive loop structure of claim 2, wherein said two end points of each said ⊓-shaped region are two ends of said opening thereof.

4. The inductive loop structure of claim 2, wherein all of said openings of said ⊓-shaped regions are aligned at the same side.

5. The inductive loop structure of claim 1, wherein said ⊓-shaped regions are connected with each other to form a fence-shaped region.

6. The inductive loop structure of claim 1, wherein each of said switches corresponding to one of said end points and said switch is capable of being switched between said grounding line and said signal ports corresponding to the same end point which said switch corresponds to.

7. The inductive loop structure of claim 6, wherein each of said grounding lines and each of said signal ports corresponding to the same end point are adjacent to each other.

8. The inductive loop structure of claim 6, wherein said inductive loop is turned on by switching one of said switches to connect to one of said signal ports.

9. The inductive loop structure of claim 8, wherein different inductive loops are turned on by switching said grounding switch to connect to different grounding lines.

10. A layout for inductive loops of an electromagnetic-induction system, comprising:
 a first inductive loop distributing in X-direction of two-dimensional coordinates in said electromagnetic-induction system, wherein said first inductive loop has a plurality of ⊓-shaped regions connected with each other; and
 a second inductive loop distributing in Y-direction of two-dimensional coordinates in said electromagnetic-induction system, wherein said second inductive loop has a plurality of ⊓-shaped regions connected with each other;
 wherein each of said ⊓-shaped regions has two end points and each of said first inductive loop and said second inductive loop comprises:
 a plurality of switches wherein each said end points of said ⊓-shaped regions is connected to one of said switches;
 a plurality of grounding lines wherein each of said grounding lines has grounding terminal and a inductive loop terminal corresponding to one of said end points of said ⊓-shaped regions;
 a grounding switch capable of being switched to any said grounding terminals of said grounding lines; and
 a plurality of signal ports wherein each of said signal ports corresponds to one of said end points of said ⊓-shaped regions.

11. The layout for inductive loops of an electromagnetic-induction system of claim 10, wherein each of said ⊓-shaped regions is a square or rectangular area having an opening at one side thereof and said two end points are two ends of said opening thereof.

12. The layout for inductive loops of an electromagnetic-induction system of claim 11, wherein all said openings of said ⊓-shaped regions face the same opening direction.

13. The layout for inductive loops of an electromagnetic-induction system of claim 11, wherein said ⊓-shaped regions are connected with each other to form a fence-shaped region or a fence-shaped inductive loop structure.

14. The layout for inductive loops of an electromagnetic-induction system of claim 10, wherein each of said switches corresponding to one of said end points and said switch is capable of being switched between said grounding line and said signal ports corresponding to the same end point which said switch corresponds to.

15. The layout for inductive loops of an electromagnetic-induction system of claim 14, wherein each of said grounding lines and each of said signal ports corresponding to the same end point are adjacent to each other.

16. The layout for inductive loops of an electromagnetic-induction system of claim 14, wherein each of said first inductive loop and said second inductive loop is turned on by switching one of said switches to connect to one of said signal ports.

17. The layout for inductive loops of an electromagnetic-induction system of claim 16, wherein different inductive loops are turned on by switching said grounding switch to connect to different grounding lines.

18. The layout for inductive loops of an electromagnetic-induction system of claim 10, further comprising a glass substrate wherein said electromagnetic-induction system is deposed on one surface of said glass substrate.

19. The layout for inductive loops of an electromagnetic-induction system of claim 18, further comprising an indium tin oxide for forming said inductive loops on one surface of said glass substrate.

20. The layout for inductive loops of an electromagnetic-induction system of claim 19, further comprising another indium tin oxide for forming a touch detection element on another surface of said glass substrate.

21. A method for fabricating a layout for inductive loops of an electromagnetic-induction system, comprising:
 providing a substrate;
 forming a first inductive loop distributing in X-direction of two-dimensional coordinates on one surface of said substrate, wherein said first inductive loop has a plurality of ⊓-shaped regions connected with each other, a plurality of grounding lines, a plurality of switches, a grounding switch and a plurality of signal ports, and each of said ⊓-shaped regions is a square or rectangular area having an opening at one side thereof and all of said openings face the same opening direction, and each of said end points of said ⊓-shaped regions in said first inductive loop is connected to one of said switches, and each of said end points of said ⊓-shaped regions in said first inductive loop corresponds to one of said grounding lines and one of said signal ports in said first inductive loop;
 forming an insulation layer on said substrate to cover said surface of said substrate and said first inductive loop;

forming a second inductive loop distributing in Y-direction of two-dimensional coordinates on said insulation layer, wherein said second inductive loop has a plurality of ⊓-shaped regions connected with each other, a plurality of grounding lines, a plurality of switches, a grounding switch and a plurality of signal ports, and each of said ⊓-shaped regions is a square or rectangular area having an opening at one side thereof and all of said openings face the same opening direction, and each of said end points of said ⊓-shaped regions in said first inductive loop is connected to one of said switches, and each of said end points of said ⊓-shaped regions in said second inductive loop corresponds to one of said grounding lines and one of said signal ports in said second inductive loop; and forming another insulation layer to cover said insulation layer and said second inductive loop.

22. The method for fabricating a layout for inductive loops of an electromagnetic-induction system of claim 21, wherein said substrate is a hard circuit board or a flexible circuit board.

23. The method for fabricating a layout for inductive loops of an electromagnetic-induction system of claim 21, wherein said substrate is a glass substrate.

24. The method for fabricating a layout for inductive loops of an electromagnetic-induction system of claim 23, further comprising forming an indium tin oxide to form said inductive loops on one surface of said glass substrate.

25. The method for fabricating a layout for inductive loops of an electromagnetic-induction system of claim 24, further comprising forming another indium tin oxide to form a touch detection element on another surface of said glass substrate.

26. The method for fabricating a layout for inductive loops of an electromagnetic-induction system of claim 24, wherein said first inductive loop and said second inductive loop are deposed on the same surface of said glass substrate.

27. The method for fabricating a layout for inductive loops of an electromagnetic-induction system of claim 21, wherein said step of forming a first inductive loop is performed to form said first inductive loop by printing process.

28. The method for fabricating a layout for inductive loops of an electromagnetic-induction system of claim 21, wherein said step of forming a second inductive loop is performed to form said second inductive loop by printing process.

* * * * *